AUTOMATIC GAIN CONTROL CIRCUITS FOR PLURAL CHANNEL RECEIVERS
Filed Nov. 14, 1966
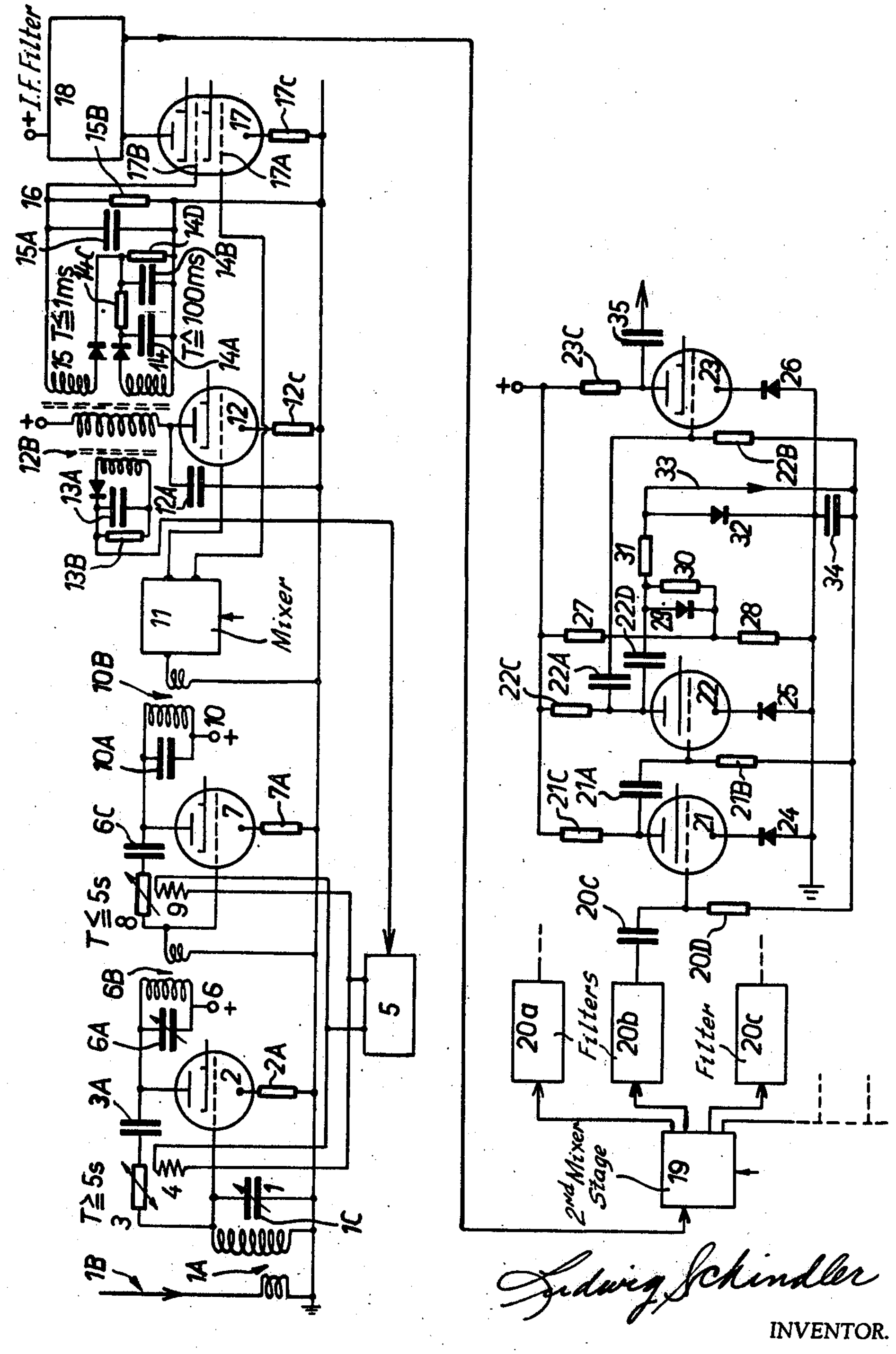
Ludwig Schindler
INVENTOR.
BY Wenderoth, Lind and Ponack, Attorneys United States Patent Office 3,496,472
Patented Feb. 17, 1970

3,496,472

AUTOMATIC GAIN CONTROL CIRCUITS FOR PLURAL CHANNEL RECEIVERS

Ludwig Schindler, Steinhausen, Zug, Switzerland, assignor to Anstalt Europaische Handelsgesellschaft, Vaduz, Liechtenstein Filed Nov. 14, 1966, Ser. No. 594,240
Claims priority, application Switzerland, Nov. 19, 1965, 15,949/65
Int. Cl. H04b 1/06
U.S. Cl. 325—307 10 Claims

ABSTRACT OF THE DISCLOSURE

A method for controlling the signal level of individual pulse communication channels contained in a band received in a short wave receiver in which the signal level fluctuations of said band are limited and the limiting subjected to a delay of several seconds, and in which each channel is separated from the band, and the signal level fluctuations of each channel are limited in dependence of its own signal level. The short wave receiver comprises an intermediate frequency stage and an interference pulse suppressor for cutting off conduction in said interference frequency stage for a period of about 0.5 to 2 milliseconds.

For receivers of multi channel-carrier frequency systems, particularly carrier frequency-telephone systems, it is known to carry out an automatic level regulation in such a manner that in a high frequency amplifying stage a level regulation is effected common for all communication channels received, and in an intermediate-frequency stage having filters connected to the latter and subsequent amplifiers, there is regulated each communication channel separated from the total frequency band and in dependence of its own level course. It is also known for carrier frequency-telephone systems to monitor by means of a hot tester, slow level changes which are caused e.g. by an attenuation of the transmission cable changed due to temperature variations, whereby the potential generated across the hot conductor at the outlet of a regulating amplifier, is coupled back to the input of the regulating amplifier via a counter-coupling. In Teletype systems, very high requirements are imposed upon the transmission of the Teletype signals (signal and spacing steps), and the obstructions of the signals, occurring along the transmission path and in the receivers, are not permitted to exceed a predetermined degree. Fading and volume regulators, as they are used e.g. for radio receivers or particularly also for telephone-short wave receivers, particularly cannot be used for Teletype-short wave receivers, since only long-time level changes can be monitored by the latter. In general the level regulation is effected by displacing the operating point of an amplifier tube along the control characteristic thereof, whereby the time constant of the unbalance-potential dependent on the reception level is selected great in comparison with the duration of one step. In case of the simultaneous reception of several Teletype channels, occasionally there can be present, in addition to the continuous fluctuations of the reception level caused by the non-constant propagation conditions, in one or in more of the individual communication channels, disturbances by interference with other radio signals, the reception level of which frequently is greater than that of the useful signals and besides short but very energetic disturbing impulse peaks can occur caused by atmospheric discharges or sparking electric units.

In known short wave receivers having an automatic amplifier regulation considering such circumstances, the regulating value, mostly a regulating space, is derived either from the energy content of the entire frequency band received, or else from a particular pilot frequency, e.g. carrier frequency at amplitude modulation or rest carrier at single-sideband modulation. The circuit means for suppressing short, strong disturbing pulses, i.e. limiter or connections for a short-time interruption of the signal path, are located behind the regulated receiver stages. These known methods for regulating receiver gain or for suppressing disturbing pulses have the disadvantage that the amplifier regulation of the individual communication channels depends not on the signal level in the channels themselves, but on a control value derived in another way. As a result, the level in the individual communication channels becomes dependent on an extraneous level course, i.e. the individual communication channels can mutually affect each other; their level becomes dependent on an eventual strong interferring signal in the whole frequency band or in proximity to the aforementioned pilot frequency. Such a control can greatly garble and graduate the useful signal pulses. Strong, short interference pulses pass through the selection means of the receiver before they can be dealt with by the limiter or interference blanking circuits. In case of narrow-band filters there occurs in this connection a substantial lengthening of the interference pulses, which prevents the reception of useful signals during the duration of the interference pulses.

According to the invention these disadvantages are avoided thereby that in the intermediate frequency stage a regulating potential is gained, which regulates the amplification of the high frequency amplifying stage in a manner known per se by changing the resistance value of a resistor which is dependent on temperature and provided in the counter-coupling circuit, by a time constant of several seconds, furthermore that there is provided in the intermediate frequency stage a threshold value circuit with a suitably proportioned time constant, by means of which the intermediate frequency-amplifier tube is blocked during the occurrence of interference pulses for a period of time ranging from 0.5 to 2 ms., whereby a biasing potential derived from the level value of the total frequency band is applied on threshold value circuit, so that only respective interference pulses having an amplitude greater than that of the respective middle reception level, will produce on the outlet of the threshold value circuit an impulse which blocks the intermediate frequency-amplifier tube, and that finally the subsequent amplifiers associated with each communication channel, are regulated in a manner known per se by influencing their counter-coupling.

Any influencing of the individual communication channels by signals lying outside of their small frequency band can be prevented thereby, and the interference effect of short, strong interference pulses can be restricted to the duration of the interference pulses by adapting to the respective mean reception level.

Preferably, a multi-stage regulating amplifier is associated with each communication channel, whereby an intermodulation-free regulation is obtained by a great change of the counter-coupling impedance and thus of the amplification, caused by a small change of the current of an amplifier element, thereby that there is connected in the basic line of the amplifier element of each amplifier stage a non-linear counter-coupling impedance, particularly a Zener diode, and the regulating potential which is gained in an amplifier stage situated ahead of the end stage by means of a diode biased in blocking direction towards a threshold value, is fed via a resistor to the control electrodes of the amplifier elements and is discharged via a diode, if it lies below the threshold value.

The invention will be explained in more detail with reference to a structural embodiment illustrated in the drawing by a circuit diagram.

The input comprises a tuned RF circuit 1 connected to the control grid of an RF voltage amplifier vacuum tube 2. The tuned circuit has an air-core input transformer 1A, the primary of which is connected to an antenna 1B and to ground and the secondary of which is connected across a variable capacitor 1C. A temperature-dependent resistance 3, in series with a voltage-blocking capacitor 3A, is connected between the plate and the control grid of the tube 2. The value of the resistance 3 can be controlled by a direct current the value of which is dependent on an amplifier 5 or, as shown, by a heater coil 4, which is connected to the amplifier 5 controlled by the automatic - volume - control potential from an AVC diode 13. The second RF stage comprises a resonant circuit 6 having a variable capacitor 6A and the primary of an air core transformer 6B in parallel, a RF voltage amplifier 7 the control grid of which is connected to the secondary of the transformer 6B, a temperature-dependent resistance 8 connected in series with a voltage-blocking capacitor 6C between the plate and control grid of the tube 7, and a heater coil 9 that controls the value of the resistance 8. The heater coil 9 is also connected to the amplifier 5. The output of the second RF stage is coupled to a first mixer 11 by a parallel resonant circuit having a capacitor 10A and an air core transformer 10B.

Part of the output of the mixer 11 is connected to the control grid of a voltage amplifier 12 and the other part to a control grid 17A of an intermediate-frequency voltage amplifier 17. The plate of tube 12 is connected to ground through a capacitor 12A. The AVC circuit consisting of the diode 13, capacitor 13A, and resistor 13B is inductively coupled to the plate circuit of tube 12 by a transformer 12B. The output of the AVC circuit is connected to the amplifier 5. The second control grid 17B of the IF voltage amplifier tube 17 is connected to a circuit—the purpose of which will presently be explained—inductively coupled to the plate circuit of tube 12. The plate of IF tube 17 is connected to an IF filter 18 of which the output is connected to a second mixer stage 19. The output of stage 19 is connected to a plurality of filters of which three are shown: **20*a*, 20*b*, 20*c* for the individual communication channels. Although only filter 20*b* is shown connected to a variable gain amplifier, it will be understood that each filter is connected to such an amplifier. The variable gain amplifier shown has three RC-coupled stages of voltage gain with tubes 21, 22, 23. The RC-coupling is effected by the components 20C, 20D; 21A, 21B; 22A, 22B. Each of the tubes 21, 22, 23 has a plate load resistor 21C, 22C, 23C, respectively. In addition, the variable gain amplifier includes the resistors 27, 28 connected in series between B+ and ground, the resistors 30, 31, the diodes 29, 32, as well as the Zener diodes 24, 25, 26 in the cathodes of the tubes 21, 22, 23**. The function of these components will be explained later.

The vacuum tubes 2, 7, 12 and 17 are cathode biased by respective resistors 2A, 7A, 12C, 17C.

In accordance with the invention, each filter **20*a*, *b*, *c***, etc. separates a single communication channel from the band received, which channel is controlled in dependence on the variations in its level. The control time constant is adapted to the length and the number of pulses per unit time of the signal pulse. Between onset of control and maximum control, the relatively simple circuit of the variable gain amplifier permits reducing variations of up to 40 to 50 db at its input to ±1 db at its output, without any noteworthy effect on the relative amplitudes of the pulses.

Since variations greater than 100 db in the communication channels cannot be controlled if the variable gain amplifier is to have an adequate signal-noise ratio, and if excessive control in the frequency converter-intermediate frequency stages is to be avoided, the average signal strength of the band to which the receiver is tuned must be taken into account. To this end, the AVC circuit provides a control voltage the value of which is dependent on this signal strength. The control voltage has a time constant of several seconds determined by the amplifier 50 and the resistance-heater coil combinations 3, 4 and 8, 9.

In order that non-linearity of the characteristic curves of the tubes 2, 7, 12 cannot cause intermodulation of the different signals in the broad bandwidth of the RF and IF amplifiers, the voltage amplification of the RF amplifier is varied by changing the amount of degenerative feedback through the resistances 3 and 8, rather than by changing the slope of the characteristic curves of these tubes.

The RF amplifier slowly compensates for the changes in the average strength of the band received. As a result, the variable gain amplifier does not have to apply more than 40 to 50 db of control to its communication channel.

The output of the first mixer stage 11 is parallel connected to the voltage amplifier 12, which furnishes the AVC voltage by means of part of its plate circuit, and to the IF amplifier 17. The other part of the plate circuit includes a diode 14 and a smoothing filter composed of two capacitors 14A and 14B, a resistor 14C connected between the capacitors, and a load resistor 14D. The diode and filter are coupled to the plate of tube 12 by a secondary winding of transformer 12B. The filter has a time constant of the order of 100 milliseconds, and supplies a positive voltage, the value of which is dependent on the average signal strength of the band received, to the cathode of a second diode 15, which is thus biased not to conduct. The second diode is coupled to the plate of tube 12 by a third secondary winding of transformer 12B. The upper end of the winding is connected to a capacitor 15A and resistor 15B in parallel.

The circuit of diode 15 has a time constant of approximately one millisecond (in the figure, equal to or less than one millisecond). The circuit, therefore, rectifies only those short interference pulses, and furnishes a negative pulse at 16, which have an amplitude greater than the average signal strength of the band to which the receiver is tuned.

A negative pulse appearing at 16 is conducted to the second control grid 17B of the IF voltage amplifier 17, which is then biased to the cut-off point for the duration of the pulse—approximately 0.5 to 2 milliseconds. Consequently, the tube is unable to furnish energy to the IF filter 18 and the filters **20*a*, *b*, *c***, etc., thereby preventing these filters from being excited into oscillation during the duration of very short interference pulses.

The short, powerful interference pulses are suppressed in the IF amplifier, because the wide bandwidth of this amplifier does not prolong the duration of the pulse. There are level fluctuations of from 40 to 50 db in the IF amplifier. For this reason the control threshold for interference suppression is made dependent on the average signal strength in the IF amplifier. The time constants of the control circuits are adapted to the duration of the information-containing pulses.

Only one variable gain amplifier, that one connected to the output of filter **20*b*, is shown. In a manner to be explained, the diode 29 supplies a control voltage that varies the slope and the plate current of tubes 21, 22 and 23, and thus indirectly the resistances of the Zener diodes 24, 25 and 26**, which serve to provide a negative-feedback path in the cathodes of these tubes.

The voltage divider 27, 28 positively biases the cathode of the diode to cut off, so that a control voltage is produced only when a signal of a certain minimum amplitude is present on the plate of tube 22. The diode 32, however, is biased to conduct and therefore has a very low resistance in the forward direction. When the diode 29 produces a control voltage, this voltage, which is negative and appears across the resistor 30, is only effective when it is greater than the positive voltage across the resistor 28. Once effective, the control voltage through lead 33 varies the grid bias of tubes 21, 22, 23 through the grid resistors 20D, 21B, 22B. The lead 33 is connected to ground through a capacitor 34.

This two-step delay in bringing the control voltage into effect results in an abrupt application of the control and in a virtually constant signal voltage at the variable gain amplifier output taken off the coupling capacitor 35.

The invention is not to be construed as limited to the particular forms disclosed herein, since these are to be regarded as illustrative rather than restrictive.

I claim:

1. A method for controlling the signal level of individual pulse-communication channels contained in a band received and amplified by a receiver, comprising the steps of limiting the signal level fluctuations of said band and subjecting said limiting to a delay of several seconds, separating each channel from the band, limiting the signal level fluctuations of each channel in dependence of the signal level of the respective channel, and subjecting said limiting to a delay sufficient to accommodate the length and the number per unit time of the signal pulses of the channel.

2. The method as defined in claim 1, wherein said step of limiting the signal fluctuations of said band includes applying a negative feedback and varying said feedback in response to the fluctuations in the signal level of said band.

3. The method as defined in claim 1, including, prior to said step of separating, the step of suppressing interference which is stronger than the average signal level of said band.

4. The method as defined in claim 3, wherein said step of suppressing includes deriving a first voltage the value of which corresponds to the average signal level of said band, and deriving a second voltage the appearance of which is controlled by said first voltage and the value of which corresponds to the interference which is stronger than the average signal level of said band, and employing said second voltage to suppress interference stronger than the average signal level of said band.

5. A circuit for controlling the signal level of individual pulse communication channels contained in a band received by a short wave receiver, comprising an RF amplifier means for amplifying said band received, means limiting the signal level fluctuations of said band, means subjecting said limiting to a delay of several seconds, an intermediate stage connected to the output of said RF amplifier means, filter means receiving the output of said intermediate stage for separating each said channel from said band, and a variable gain amplifier means for each said channel connected to said filter means for limiting the signal level fluctuations of its respective channel in dependence of the signal level of the channel.

6. The circuit as defined in claim 5, wherein said RF amplifier means includes at least one stage of amplification, said stage including a temperature-dependent negative feedback path having a time constant of several seconds.

7. The circuit as defined in claim 6, wherein said negative feedback path comprises a temperature dependent resistance means, and said circuit including means for heating said resistance in dependence on the average signal level present in said band.

8. The circuit as defined in claim 7, wherein said stage includes a vacuum tube having a plate and a control grid, said negative feedback path being located between said plate and control grid.

9. The circuit as defined in claim 5, including an interference pulse suppressor means for cutting off conduction in said intermediate stage for a period of about 0.5 to 2 milliseconds.

10. The circuit as defined in claim 5, wherein said variable gain amplifier includes at least one voltage amplifying vacuum tube, and including means for deriving a voltage for varying the plate current of said tube, and a Zener diode in the cathode of said tube.

References Cited

UNITED STATES PATENTS

| | | | |
|---|---|---|---|
| 2,695,927 | 11/1954 | Caruthers et al. | 179—15 |
| 2,705,321 | 3/1955 | Beck et al. | 343—206 |
| 3,109,989 | 11/1963 | Muir | 325—326 X |
| 3,042,800 | 7/1962 | Gluth | 325—326 |

ROBERT L. GRIFFIN, Primary Examiner

BENEDICT V. SAFOUREK, Assistant Examiner

U.S. Cl. X.R.

325—321, 404; 343—206